United States Patent
Sudo

[11] 3,821,343
[45] June 28, 1974

[54] MANUFACTURING METHOD OF THERMOPLASTIC SYNTHETIC RESIN FILMS

[75] Inventor: Michio Sudo, Tokyo, Japan

[73] Assignee: Mitsubishi Yuka Kabushiki Kaisha, Tokyo, Japan

[22] Filed: June 27, 1972

[21] Appl. No.: 264,750

Related U.S. Application Data

[60] Continuation of Ser. No. 32,585, April 17, 1970, abandoned, which is a division of Ser. No. 724,795, April 29, 1968, Pat. No. 3,543,334.

[52] U.S. Cl............. 264/89, 264/90, 264/95, 264/96, 264/178 R, 264/209, 264/210 R, 264/237
[51] Int. Cl............................. B29c 17/07
[58] Field of Search..... 264/95, 89, 209, 90, 210 R, 264/289, 237, 178 R, 290

[56] References Cited
UNITED STATES PATENTS

| | | | |
|---|---|---|---|
| 2,423,260 | 7/1947 | Slaughter | 265/95 |
| 2,519,375 | 8/1950 | Jargstorff et al. | 264/89 |
| 2,987,767 | 6/1961 | Berry et al. | 264/95 |
| 3,114,172 | 12/1963 | Coste | 264/95 |
| 3,169,272 | 2/1965 | Maxson | 264/95 |
| 3,296,661 | 1/1967 | De Moustier | 264/89 |
| 3,300,555 | 1/1967 | Bild et al. | 264/209 |
| 3,385,918 | 5/1968 | Jack et al. | 264/89 |

*Primary Examiner*—Jeffery R. Thurlow
*Attorney, Agent, or Firm*—Michael S. Striker

[57] ABSTRACT

A hollow tube of thin thermoplastic film is extruded in downward direction and expanded to a desired cross-section. Immediately after this expansion the tube is guided into a liquid bath and along a perforate element which extends in direction of travel of the tube. The liquid in continuously circulated along the interface of the travelling tube and the perforate element and is being drawn through the latter in the direction away from this interface. This serves to cool the tube and at the same time to draw the same against the perforate element due to the suction resulting from the liquid passing through the same, so that the tube is not only cooled but also supported against and by said perforate element.

14 Claims, 23 Drawing Figures

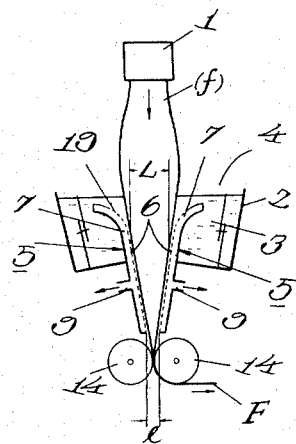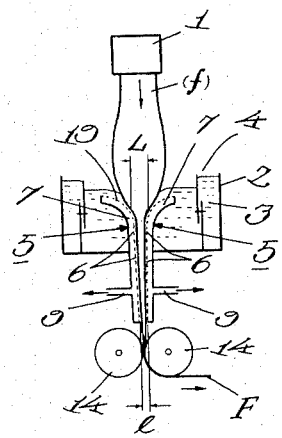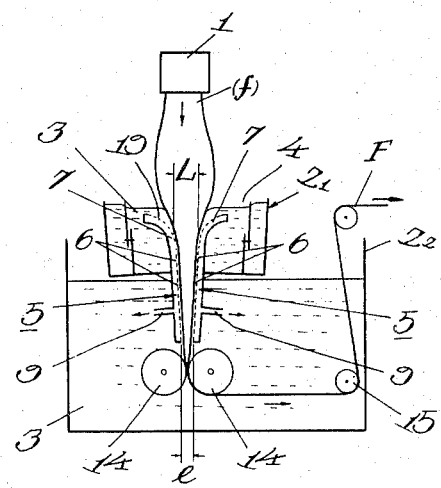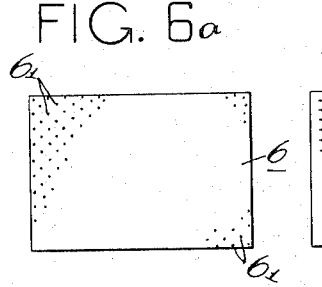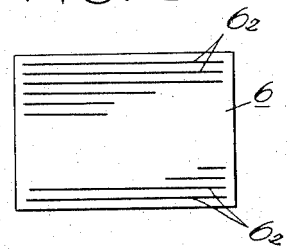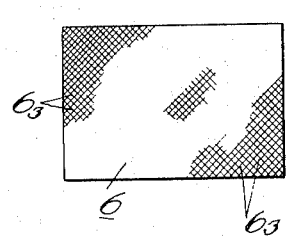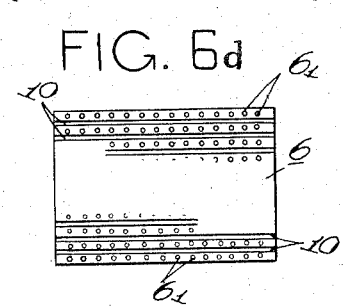

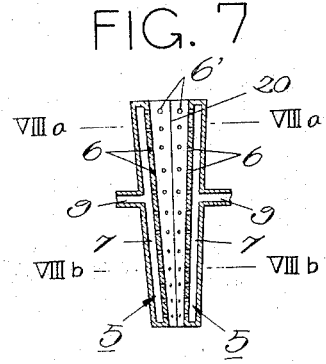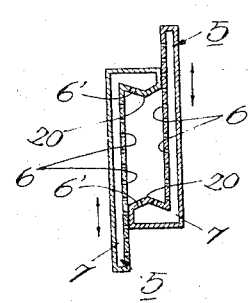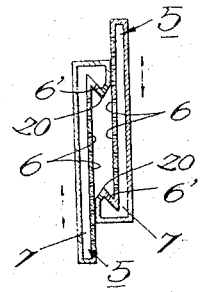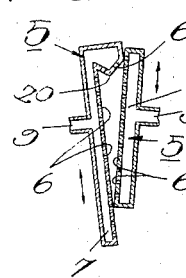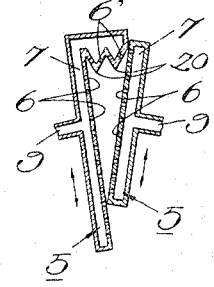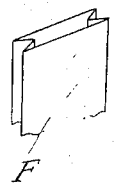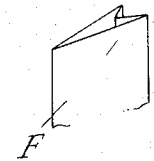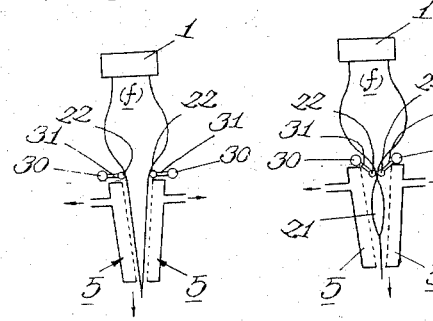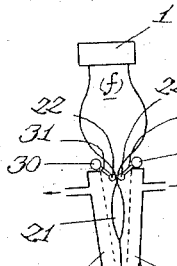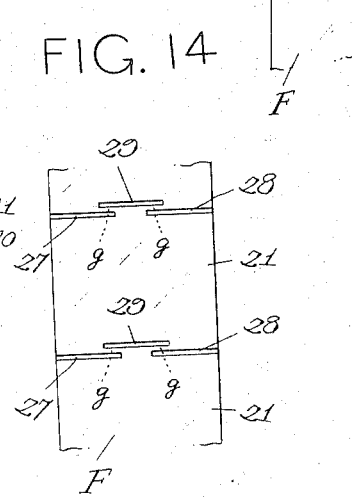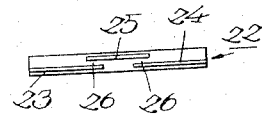

MANUFACTURING METHOD OF THERMOPLASTIC SYNTHETIC RESIN FILMS

This is a continuation of my prior application Ser. No. 32,585, filed on Apr. 17, 1970 and now abandoned, which in turn was a division of Ser. No. 724,795, filed Apr. 29, 1968, now U.S. Pat. No. 3,543,334 issued Dec. 1, 1970.

BACKGROUND OF THE INVENTION

The present invention relates to a method of manufacturing thermoplastic synthetic resin films.

It is already known, for example from my prior U.S. Pat. No. 3,543,334, to make cylindrical films of thermoplastic synthetic resin. Basically, the methods employed for this purpose may be classified as to two main groups, namely cooling of the resin film by air and cooling by liquid.

If the resin film is cooled during the manufacture by air, the film + which is extruded in tubular form and in fused resin shape from an extruder — must be advanced for a considerable distance and period of time before it becomes solidified by the air which is blown against it. This means, of course, that the manufacturing equipment must afford a path of requisite length for the film to traverse and must therefore be large. An additional disadvantage of this method is the fact that the fused resin is cooled only gradually and thus can crystallize with a resulting poor transparency.

Resort to the liquid cooling method avoids the disadvantages of the air cooling method. In particular, crystallization of the resin is prevented by the much more rapid cooling effect in the liquid cooling method and the resulting product is of a higher quality than a product which is air-cooled. However, heretofore, no efficient manufacturing method employing liquid cooling has become known, based on a compact and simple device.

One liquid cooling method provides for first blowing cooling air against the outer surface of a cylindrical resin film, and the surface of the outer or inner side is subsequently contacted by a water cooling jacket. According to another method, air is blown into the cylindrical film which is extruded in downward direction vertically from an annular die. Cooling water is then circulated continuously along the outer surface of the cylindrical or tubular film, cooling and solidifying the same. Both of these methods are currently in use, but in both instances it is necessary to replace either the water cooling jacket or the water cooling ring which dispenses the cooling water with another one of different diameter every time the diameter of the extruded film tube is changed. In addition, the equipment required still must have undesirably large portions.

A further approach known from the related literature suggests the blowing of air into the inside of a cylindrical extruded film in order to expand the film to a desired size, whereupon the film is conducted into water to be immediately cooled and solidified. A guide plate serves to flatten the film in the water and a drawing roll also located in the water continuously withdraws it. Of course, the initial cylindrical or tubular form of the extruded film is deformed under the pressure of the water and shrinkages occur in addition to which on collapse of the cylindrical film to flattened shape the juxtaposed wall portions move into contact. The result of this is various difficulties which the prior art method in question seeks to avoid by introducing water into the interior of the film tube. This, is disadvantageous because the moisture thus introduced cannot subsequently be completely removed and if the film is used for making packages or the like, the contents will be disadvantageously affected by such residual moisture. This method therefore has not to this time found practical application in the industry.

SUMMARY OF THE INVENTION

The present invention proposes a method for the manufacturing of thermoplastic synthetic resin films, using a liquid cooling system and is based on an approach entirely different from those known in the prior art.

According to the present invention, the fused resin is continuously extruded in downward direction from an annular or elliptical die of an extruder, and air is blown into the inside of the cylindrical film during such extrusion in order to expand to a required size. The thus expanded film is then conducted into a liquid cooling tank to be cooled and solidified and as it moves through this tank the outer surface of the film is drawn by suction against a support element which protects it and the inside of which — the side facing away from the film — is always kept at a negative pressure. This support element prevents variations in shape and generation of shrinkages that might otherwise result from water pressure acting upon the film and a bag-shaped film of any desired form is thus manufactured in a single operation, without either generating shrinkages on the film surface or risking the undesirable close contact of the inside surfaces within the film.

By properly configurating the mold, cylindrical film of any preferred shape — such as a pillow shape, a shape having both sides corrugated or having only one side corrugated — can be manufactured. At the same time, the film tube may be subdivided into sealed bags during the continuous travel of the film tube, so that the present invention is clearly highly versatile.

BRIEF DESCRIPTION OF THE DRAWING

FIGS. 5a – 5c show side views of other embodiments;

FIGS. 6a – 6d respectively show front views of four examples of screen surfaces of liquid screen elements which can be used in the invention;

FIG. 7 is a sectional side view of a screen plate for molding the cylindrical corrugated film shown in perspective view in FIG. 10a;

FIGS. 8a – 8b respective sectional views taken on lines VIIIa—VIIIa and VIIIb—VIIIb of FIG. 7;

FIGS. 9a and 9b are cross sectional end views respectively, of the liquid screen boxes for producing the cylindrical corrugated film shown in perspective view in FIGS. 10b and 10c;

FIG. 10a is a cylindrical film produced with the device shown in FIG. 7, illustrated in a perspective view;

FIGs. 10b and 10c are perspective views showing the cylindrical films produced with the devices shown in FIGS. 9a and 9b;

FIGS. 11 and 12 respectively show side views of a further embodiment;

FIG. 13 is a front view of the detail of the embodiment of FIGS. 11 and 12;

FIG. 14 is a front view of a film produced with the device in FIGS. 11 – 13.

DESCRIPTION OF THE PREFERRED EMBODIMENTS

Figure 1:
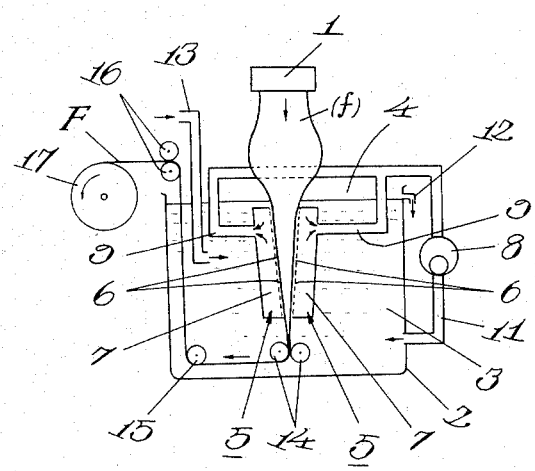
FIG. 1 is a side view of an apparatus for carrying out the present method.
Figure 2:
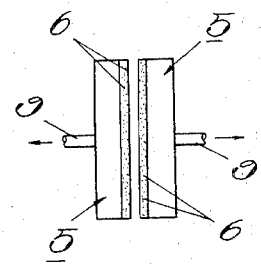
FIG. 2 is a partial plan view of FIG. 1, showing the structure of important portions thereof.

In the drawing, reference numeral 1 generally indicates an annular or elliptical extruding die provided at the front end of an extruder from which thermoplastic synthetic resin is extruded; thermoplastic synthetic resin such as polyethylene or polypropylene is extruded as a cylindrical film $f$ in thermally fused state from the die 1 in downward direction. Reference numeral 2 indicates a tank for cooling liquid containing a body of cooling liquid 3, and having an opening 4 which is located beneath the die 1. Reference numerals 5,5 indicate a pair of liquid screen boxes located beneath the surface of the cooling liquid 3 and facing towards one another directly below the die 1; the boxes 5,5 are arranged at a desired transverse spacing. They have cooling liquid screen portions 6,6 which are formed on the opposed surfaces of the boxes 5,5 so that cooling liquid may be drawn into the latter through the portions 6,6. Reference numerals 7,7 indicate cooling liquid chambers in the interior of the boxes 5,5 and suction tubes 9,9 extend from those surfaces of the boxes 5,5 which are located oppositely the screen portions 6,6.

Thermoplastic synthetic resin film is first extruded through the die 1 of the extruder in downward direction forming the cylindrical film tube $f$. Into the side of the tube $f$ air is blown, thereby expanding the film tube to a desired size. Thereupon the expanded film tube is immediately conducted into the cooling liquid tank 2 which contains the cooling liquid 3 for instance water or water with table salt admixed thereto. On entry into the cooling liquid, the cylindrical film tube $f$ is immediately cooled and solidified.

A pair of rather thin screen boxes 5,5 is located within the tank 2 and are provided with screen surfaces on their opposed surfaces which bound between themselves a gap having a vertical orientation and into which the film tube $f$ enters. The juxtaposed surfaces of these boxes 5,5 which are made fluid-tight except for these juxtaposed surfaces, may be provided with perforations 61, with slits 62, or with small mesh screen nets 63, as shown in FIGS. 6a – 6d. In addition it is contemplated to provide numerous parallel recessed grooves 10 as shown in FIG. 6d, in order to expedite the inflow of cooling liquid. Thus, the cooling liquid screen portions 6,6 are formed and these configurations make the operation of the boxes 5,5 more effective.

FIG. 1 shows that a suitable suction pump 8 is connected with the tubes 9,9 of the screen boxes 5,5, so that cooling liquid 3 is drawn into the interior of the screen boxes 5,5 and from there via the tubes 9,9 to the pump 8. The latter is in turn connected via a tube 11 with the bottom part of the tank 2, either directly or through a non-illustrated heat dissipation mechanism, so that the liquid 3 withdrawn by the pump 8 is recycled via the conduit 11 into the tank 2.

The upper surfaces of the screen boxes 5,5 are positioned in a common transverse plane located substantially at or submerged slightly below the surface of liquid 3, in the case of submergence by an extent of between 0–30 mm. To keep the cooling liquid surface always constant an overflow opening 12 is provided in the side wall of the tank 2 in order to keep the temperature in the upper portion of the tank 2 within a predetermined range to assure that cooling temperature will be 20°–25° C., a supplementary conduit 13 extends into the interior of the tank 2 so that the temperature of the liquid 3 therein may be circulated as required.

Figure 3:
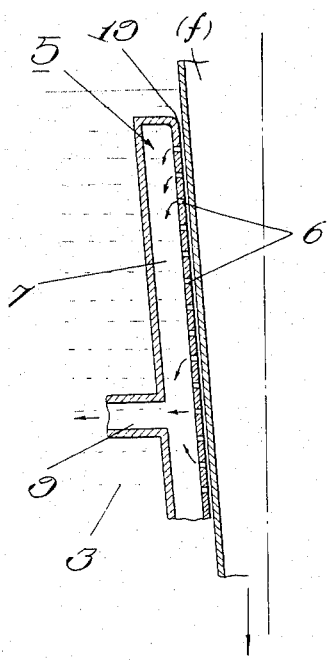
FIG. 3 is an enlarged sectional detail view of the embodiment of FIG. 1.

The cylindrical film $f$ is extruded from the die 1 of the extruder and as it advances along the pair of liquid screening boxes 5,5 becomes flattened, however, by the presence of the perforations 61, the slits 62 or the net screen 63 on the screening portions 6,6 the film $f$ is intimately passed through the cooling liquid 3. In other words, the negative pressure obtained at the screening portions 6,6 draws the cylindrical film $f$ towards the latter, and cooling liquid 3 is drawn into the gap between the film $f$ and the screening portions 6,6 so that it flows continuously between the interface of the film $f$ and the screening portions 6,6 through the perforations 61 slits 62 or net screen 63. Continuously fresh cooling liquid 3 thus cools the outer surface of the film $f$ and in this manner excellent transparent film is obtained while at the same time the flowing cooling liquid serves a lubricant purpose, analogous to a lubricant oil, as shown in FIG. 3. Thus, although the film $f$ travels in contact with the screening portions 5,5 of the box 5,5 there is no need to fear damaging of the surface of the film f and no variation will take place in the shape of the film $f$ due to the variation of liquid pressure as the film travels deeper into the liquid 3. Furthermore, it has been found that no shrinkages will take place on the outer surface of the film f.

The film, thus cooled, solidified and passed through a pair of rolls 14,14 provided below the boxes 5,5 is subsequently drawn to a take-up roll 17, between rolls 16,16 which removes the cooling liquid and are provided on the outside of tank 2.

With this embodiment described herebefore, so called "pillow-type" synthetic resin film F of tubular configuration can be produced. Subsequently, the production of other types of film will also be described in detail with reference to the appropriate Figures.

First it is pointed out that in a pair of screening boxes 5,5 as shown in the various Figures, the distance between the mutually opposed cooling liquid screening portions 6,6 differs between the upper spacing L and the lower spacing l; it is generally preferable if L is greater than l. It has been ascertained experimentally that L should desirably be between 5 and 50 mm, and that l should be between 5 and 15 mm. It has been further ascertained that, if the upper spacing L is substantially larger, the amount of liquid drawn by the screening boxes 5,5 must also be made larger and the flow speed of the cooling liquid naturally becomes larger, thereby creating vibrations in the cylindrical film $f$ and resulting in the development of disadvantageous effects on the formed film. On the other hand, if the spacing L is smaller, the take-up operation for the film becomes difficult.

Figure 4:
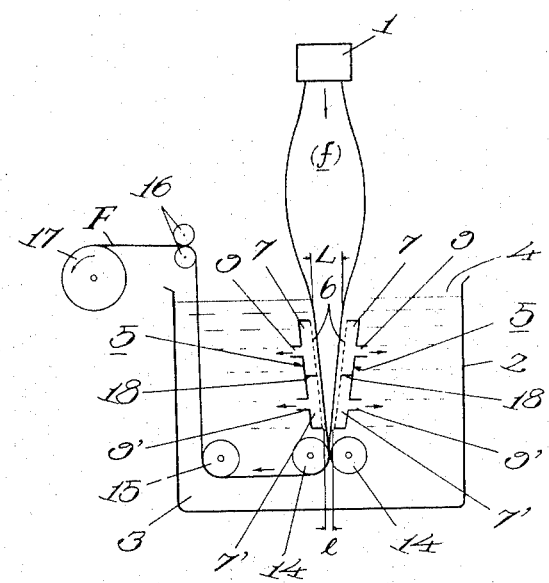
FIG. 4 is another view, similar to FIG. 1, but showing a different embodiment.

As just described the spacing between the upper and lower portions L and l should be generally L greater than l, but the boxes 5,5 may also be arranged so that $L = 1$, or L is smaller than 1, depending upon the particular type of synthetic resin used, the thickness of the film or the speed of extrusion. The boxes 5,5 are partitioned by separators 18,18 at the center thereof, as shown in FIG. 4. This forms cooling liquid chambers 7,7' and 7,7' in the upper and lower portions of the boxes and these chambers are each independent of the other so that different liquid pressures based on the depth of the cooling liquid 3 prevail in the upper and lower portions of the boxes. The suction force acting upon the upper and lower chambers 7,7' and 7,7' of the two chambers is differentiated by having separate suction tubes 9,9' and 9,9' communicating with the chambers. In other words, because the liquid pressure in the upper chambers 7,7 is smaller than that in the lower chamber 7',7' a smaller suction force suffices, on the other hand, as the liquid pressure is greater in the lower chamber 7'7,7' by comparision with that in the upper chamber 7,7 a greater suction force is required. This avoids the danger of rupture and deformation of the film *f* especially in the lower portion of the boxes 5,5. As required, partition plates 18,18 may be provided at different levels whereby multi-step suction chambers can be constructed in the screening boxes 5,5 and the variation in liquid pressure may be distributed over the depth of the boxes.

In some cases a curved portion 19 may be provided according to requirements, on the mutually opposed upper portions of the boxes 5,5. Such portion 19 may be formed partially on the structure of the boxes as described before and in some cases (see FIGS. 5a–5c) the mutually opposed upper portions of the boxes 5,5 may themselves be shaped arcuately. In any case, it is preferable that the radius of the arc of the portion 19 be in the range of 2–50 mm. With such a construction it can be expected that the flow of the cooling liquid 3 from the upper end will be good, and at the same time the quality of the expanded cylindrical film can be maintained high. Of course, this is influenced by the quality of synthetic resin, the thickness of the film, and other considerations.

It is desirable that the boxes 5,5 be located at the same level with the liquid surface of the cooling liquid, or that their upper ends are submerged below this level to a depth of about 30 mm, especially because the film is cooled and solidifed by contact with the cooling liquid. If the boxes 5,5 are submerged deeper than necessary, the danger exists that their purpose may be lost with the result that damage or rupture of the film may occur, by the rise of the cooling liquid.

Also, it is desirable that the liquid screening portions 6,6 have a surface which is made of a material resistant to heat, such as a synthetic plastic like Teflon (Trademark) bakelite, polypropylene, or even cloth. The perforations 61, slots 62 and net screen 63 of the portions 6,6 are such that the whole diameter or slit width in the lower portion of the respective screening portion 6,6 is larger by comparison with that in the upper portion, or else that the number or holes or slits is larger, in order to prevent the liquid pressure and deformation based on the difference of the liquid pressure. The dimensions of the holes 61 or slits 62 are advantageously below about 5 mm., but if they are made smaller, the loss in pressure becomes greater and closes blocking of the holes. On the other hand, if the dimensions are made too much larger than necessary, the film is drawn by suction into the holes more than necessary and the danger exists that it might be damaged. Therefore, the size of the holes or slits must be determined by the material of the film, the thickness and the extrusion speed.

The amount of cooling liquid drawn through the screening portion 6,6 is of course determined by the pump 8 or the capacity of its motor, but the optimum condition is such that the cooling liquid passes between the advancing cylindrical film *f* and the screening portion 6,6 at proper strength and that the film is contacted with the cooling liquid screening portion 6,6 at a proper and suitable strength by suction. When the suction effect exerted by the cooling liquid is too large the outer surface of the film *f* is closely contacted with the screening portions, whereby the advancement of the film is ended and circulation of the cooling liquid becomes disturbed. This reduces the cooling effect and the desired quality of the product becomes unobtainable. Conversely, the film may also become ruptured or deformed by the liquid pressure if the suction effect of the cooling liquid is too small.

It has been ascertained experimentally that if the take-up speed of the film *f* is between 10 m/min. and 400 m/min., good results are obtained based on the aforementioned conditions.

Following are the results of experiments performed on equipment, such as is shown in FIG. 4.

1. Film-forming conditions:
   Extruder: nozzle diameter 120 mm,
   Length/diameter: 25 (L/D)
   Die: 260 mm. diameter spiral type;
   Screens 6,6: Upper curved surface rectangular with lateral width 600 mm. longitudinal width 300 mm.

L:10–15 mm., 1:3–5 mm./1.5 kw.
   Cascade. pump: gear pump.
   On the screens air gap: 350 – 400 mm. gear pump.
   amount of extrusion: 200 kg/hr.

2. Resin used:
   High pressure polyethylene A MI 0.5 S.G 0.920
   High pressure polyethylene B MI 0.5 S.G. 0.927

3. Results:

| | Present Invention |
|---|---|
| Quality of film | |
| Uneven thickness | within ± 15% |
| Bending diameter: | below 2 mm. |
| Outer appearance: | good |
| Curles: | slightly |
| Transparency: | good |
| Shock strength: | strong |
| Heat scalability: | good |
| Shrinkage: | none |
| | |
| Formability: | Present Invention: |
| Formation stability: | good |
| Cooling effect: | good |
| Operability: | good |
| (Formability range) | |
| Thickness: | 0.02–0.3 mm. |
| Bending diameter variation: | Greatly characterized in that a show of 0.8–1.4 is obtainable without replacing the member. |

The above results clearly indicate that the film is excellent in outer appearance and at the same time in formability.

Coming to the embodiment shown in FIGS. 5a and 5b, it will be seen that the constructions are such as to prevent production of a poor product based on the difference in the liquid pressure in the upper portion and the lower portion of the screen boxes 5,5. In these embodiment, the upper spacing L and the lower spacing 1 are significantly different in both the boxes 5,5 and in either case the liquid tank 2 is provided on only the upper portion of the boxes 5,5 whereas the lower portion is located outside the tank. In consequence, no substantial liquid pressure acts on the lower portion. However, although there is no danger of rupture due to pressure and deformation by the liquid pressure, and although the formability of the cylindrical film obtained is quite excellent, these embodiments have the drawback that part of the flowing cooling will flow out of the tank with the film $f$.

On the other hand, in the embodiment shown in FIG. 5c, the tank 2 for the cooling liquid is divided into the illustrated upper and lower sections. Here, cooling of the film at the upper portions of the boxes 5,5 takes place by cooling liquid 3 of the upper tank section 21, and at the lower portion by the cooling liquid 3 of the lower tank section 22. In this embodiment there is no danger that the cooling liquid might flow from the upper tank 21 and become lost, contrary to the preceding two embodiments.

Here, again, experimental results were obtained with the equipment of FIGs. 5a, 5b and 5c. These results are shown in the following table.

1. Molding condition:

Same as the condition described before but L and 1 in each case are different as shown in the lower column of the result.

2. Resin used:
Same as described before.
3. Results:

| Film quality | FIG. 5a | FIG. 5b | FIG. 5c |
|---|---|---|---|
| Uneven thickness | within ± 15% | within ± 15% | within ± 15% |
| Bending diameter variation: | below 2 mm | below 2 mm | below 2 mm |
| Outer appearance: | Water-flow tracing | good | good |
| Curling: | a little | small | small |
| Shrinkage: | none | none | easy to enter thin substance |
| Formability: | FIG. 5a | FIG.5b | FIG. 5c |
| Formation stability: | good | good | good |
| Coolability: | somewhat good | somewhat bad | good |
| Operability: | good | good | good |
| (Formation range) Thickness: | 0.02–0.3 mm | 0.02–0.3 mm | 0.02–0.3 mm |
| Bending diameter variation: | 0.8–1.4 | 0.8 –1.4 | 0.8 –1.4. |
| L (mm) | 1–20 | 10–15 | 60 |
| l (mm) | 10–15 | 10 | 10 |

As shown above, the manufacturing method according to the present invention based on FIGS. 5a–5c is clearly superior to the conventional approach, known as the Daw method. It will be apparent that the sizes of L and l and the selection of the manufacturing apparatus must be determined based upon the various conditions relating to the type of material used or the quality and thickness thereof, and the like.

It will be appreciated, that a single cooling and manufacturing process makes it possible to perform the whole process in the range of blow ratio 0.8 – 1.4 and that it is not necessary to exchange the cooling ring each time the bending diameter changes, such exchange is greatly hampering the high quantity production in handling as well as in time.

The size of the cylindrical film $f$ can be selected as desired so long as the width of the cylindrical film $f$ is less than the width of the screening boxes 5,5 so that it is possible to manufacture the film F of almost any size but using a set of appropriately dimensioned screening boxes 5,5.

According to a further embodiment the invention also is applicable to the manufacturing of so-called corrugated or gusseted type cylindrical films $f$. FIGS. 7 – 10c show how this is accomplished.

Screening boxes 5,5 shown in FIGS. 7 – 8b are for the type of film $f$ which is corrugated on both sides, and accordingly one lateral side of each of the mutually opposed faces of the screening portions 6.6 of the boxes 5,5 is provided with a corrugated hollow portion 20,20 extending inwardly in mount-shaped configuration. In addition, the angle O of the mount is accute gradually in direction towards the lower portion from the upper portion. These hollow portions 20,20 are formed by screening portions 6',6' and their interior communicates with the cooling liquid chambers 7,7. One of the portions 20,20 is provided on the left-hand side of the pair of the screening boxes 5,5 connected therewith and the other on the right-hand side. This results in a molding space as shown in FIGS. 8a and 8b. Thereby, in a method similar to the one described with the previous embodiment, the cylindrical film $f$ is extruded through the die and cooled by liquid all over its contact with the surfaces of the screening portions 6,6 and screening portions 6',6'. Therefore, the film $f$ is being cooled and supported while being shaped, and a corrugated cylindrical film $f$, corrugated at opposite sides is obtained.

FIGS. 9a and 9b showsthat a single one or more than two of the mount-formed corrugated portions 20 may also be provided on on the one screening box 5 in order to form a corrugated film having only one side corrugated as shown in FIGS. 10b and 10c. Here, the screening boxes 5,5 must have mutual contact at the lateral side remote from portion 20.

By having both the screening boxes shifted in opposite directions, and since the spacing can be varied in the area of the suction, the size can be adjusted freely and the width of the cylindrical film $f$ need not be restricted.

A further embodiment concerns the method of producing not only the cylindrical film $f$ but also to provide seals across the same for forming it into bag-shaped bodies continuously. FIGS. 11 to 14 showsthat substantially at the same time as the fused resin film F of tubular shape is contacted with the cooling liquid, a set of bars 22,22 provided above the screening boxes 5,5 is made to advance from the left and the right. The bars are contacted under pressure so as to hold the cylindrical film F momentarily, whereby the fused resin film is sealed in a very simple manner. When the film $f$ is advanced in a complete straight line at the time the bag bodies 21 are formed, air trapped in the same remains within them and cannot escape; this would have adverse effects on the subsequent treatment, as well as making the take-up of the subdivided film difficult or impossible. Therefore, the film contact surface of one of the bars 22 is provided with three parallel projections 23, 24 and 25 having mutual gaps $g$. The portions of each bag-body 21 into which the film f is subdivided are then formed with non-continuous sealing lines 27, 28 and 29 by these projections 23, 24 and 25. Since the gaps remain in the sealing lines the air in each bag-body can easily be discharged through these gaps longitudinally of the film. The set of bars 22,22 is assembled at the front end each of rods 31, having respective pivots 30,30. During extrusion of the cylindrical film f the set of bars 22,22 is rotated with the pivots 30,30 as the center of movement and the sealing operation can be performed at desired spacings between consecutive seals.

It will be appreciated that one projected line may be provided all along one of the bars 22, a pin for making a pin hole being provided on the underside of the projection. This makes it possible to discharge the air in the cylindrical film sealed by the bar 22 but this is not shown. In addition, in such an embodiment the functional effect of a pair of the screening boxes 5,5 is exactly the same as in the preceding embodiments.

Because the fused resin is immediately immersed into the cooling liquid and guided by the screening boxes, it is quickly cooled and solidified and the crystallization of the resin is prevented. This results in a final product of very high transparency and quality. In addition, when the cylindrical film is cut into bags, no inward curling of the film on both sides of the cutting takes place, and, therefore, when goods are to be placed into the resulting bag, the operation is extremely easy.

The product obtained is also superior in antishocking quality by comparison with the product obtained by conventional manufacturing methods, aside from the fact that as the distance from the die to the cooling liquid is sufficiently short and the cooling liquid in the liquid tank is constantly circulated, the film can be cooled at a temperature which is maintained constant, especially because the compensating supply for the liquid can be effected very rapidly. Consequently, the cooling effect is very good, and at the same time, the depth of the cooling liquid tank can be changed freely and the compactness of the whole equipment can be unlike anything previously obtained.

As long as the liquid level of the cooling liquid can be maintained static, there is no ripple on the surface and a smooth finish of the film can be obtained. In addition, because the cooling liquid tank is provided with a pair of screening boxes each having the perforations, slots or the like, the fused resin film is always cooled by fresh cooling liquid circulating at its interface with the screens and which is pulled through the perforations in the screens. The negative pressure exerted thereby upon the film aids in its travel in the direction of take-up with the cooling liquid acting as a lubricant between film and screening portions of the screening boxes. This means there is no change for either the shape or the film to deteriorate or shrinkages to become generated on its surface by the pressure of the cooling liquid.

By having the shape of the cooling liquid screening portions variously changed, the bag form or the pillow-type, the one-side corrugated type or the both-side corrugated type film can be manufactured as required. By having sealing means provided, sealed bag bodies can be manufactured continuously and therefore the present invention is capable of multiple utilization and indeed constitutes a novel idea.

The invention also makes it possible to obtain two sheets of film, each different in its physical character, by spraying air or hot water onto one side only directly before the film is dipped into the cooling liquid, and the molding condition can be maintained by treating the folding portion by cooling air locally prior to folding once-expanded cylindrical film into a flat form by a pair of screening boxes.

The bars 22,22 discussed above are made freely rotatable and interpose the cylindrical film f therebetween and the projections formed on the periphery of the rolllike bars 22 permit the sealing of the cylindrical film f to be successively formed longitudinally of the film, or by the projections in parallel formed on rotary bars 22, the film may be formed in or subdivided into square segments, thereby forming desired bag bodies of any requisite shape. The air in these bodies can be expelled through pin holes, as discussed above.

Various embodiments according to the present invention have been described, but it will be appreciated that the invention is not intended to be restricted to such embodiment, and that any change or changes within the scope of the technical art are intended to be within the concept of the present invention.

I claim:

1. A method of manufacturing tubes of thermoplastic synthetic film, comprising the steps of extruding an internally unsupported hollow tube of thermoplastic synthetic film for travel in a substantially vertical direction; expanding the internally unsupported traveling tube to a desired cross section; progressively flattening the expanded internally unsupported tube while guiding it along a perforate element located in a bath of cooling liquid and which extends in said direction and has one side facing towards and another side facing away from the tube; and continuously circulating cooling liquid from said bath along the interface of the traveling tube and said one side and thereupon through said perforate element in a direction outwardly away from said tube and to said other side, whereby to cool said tube and to draw the same toward said one side of said element by the suction resulting from passage of said cooling liquid to said other side.

2. A method as defined in claim 1, wherein an additional preforate element is provided, similar to and defining with the first-mentioned perforate element a gap which is elongated in said direction; and wherein said expanded tube is guided along both of said perforate elements, and said cooling liquid is continuously circulated through both of said perforate elements from the respective one to the respective other sides thereof.

3. A method as defined in claim 1, said element having an upper and a lower portion which are immersed in said bath of cooling liquid at a lesser and a greater depth, respectively, the combined cross-sectional area of the perforations in said upper portion being smaller than the combined cross-sectional area of the perforations in said lower portion; and wherein the step of circulating the cooling liquid through said element comprises circulating said cooling liquid through the perforations of said upper and lower portions at substantially equal liquid pressure.

4. A method as defined in claim 1, said element being hollow and said other side being the interior of said element; and further comprising the step of subdividing said interior into at least two discrete superposed chambers.

5. A method as defined in claim 2, each of said elements having a pair of lateral margins extending in said direction and laterally bounding said gap; further comprising the step of engaging and inwardly gusseting the travelling tube with at least one perforate one of said margins of at least one of said elements; and continuously circulating said cooling liquid along the interface of said tube and of said one perforate margin, and through the latter outwardly away from said tube.

6. A method as defined in claim 1; and further comprising the step of providing the travelling tube at longitudinally spaced locations thereof with respective transversely extending discontinuous sealed seams to thereby divide the tube into longitudinally arrayed communicating compartments.

7. A method as defined in claim 6, wherein the step of providing the tube with said transverse seams is carried out subsequent to expanding of the tube but prior to guiding of the same along said perforate element.

8. A method of manufacturing tubes of thermoplastic synthetic film, comprising the steps of extruding an internally unsupported hollow tube of thermoplastic synthetic film for travel in an upright direction and path; interposing in said path a bath of cooling liquid having immersed therein a perforate element which extends in said direction and which has one side and an opposite side; expanding the traveling tube to a desired cross section upstream of said bath; guiding the expanded tube substantially vertically through said bath along said one side of said perforate element; continuously circulating liquid of said bath along the interface of the traveling tube and said one side, and thereupon through said perforate element in direction outwardly away from said tube and to said other side, whereby to cool said tube and draw the same toward and into supported engagement with said one side of said element by the suction resulting from passage of the circulating liquid to said other side; and progressively flattening the expanded tube during travel thereof along said one side of said perforate element.

9. A method as defined in claim 8, wherein an additional perforate element is provided in said bath, similar to and defining with the first-mentioned one a gap which is elongated in said direction; and wherein said expanded tube is guided along both of said perforate elements, and said cooling liquid is continuously circulated through both of said perforate elements from the respective one to the respective other sides thereof.

10. A method as defined in claim 8, said element having an upper and a lower portion which are immersed in said bath of cooling liquid at a lesser and a greater depth, respectively, the combined cross-sectional area of the perforations in said upper portion being smaller than the combined cross-sectional area of the perforations in said lower portion; and wherein the step of circulating said cooling liquid through said element comprises circulating said cooling liquid through the perforations of said upper and lower portions at substantially equal liquid pressure.

11. A method as defined in claim 8, said element being hollow and said other side being the interior of said element; and further comprising the step of subdividing said interior into at least two discrete superposed chambers.

12. A method as defined in claim 9, each of said elements having a pair of lateral margins extending in said direction and laterally bounding said gap; further comprising the step of engaging and inwardly gusseting the travelling tube with at least one perforate one of said margins of at least one of said elements; and continuously circulating said cooling liquid along the interface of said tube and said one perforate margin and through the latter outwardly away from said tube.

13. A method as defined in claim 8; and further comprising the step of providing the travelling tube at longitudinally spaced locations thereof with respective transversely extending discontinuous sealed seams to thereby divide the tube into longitudinally arrayed communicating compartments.

14. A method as defined in claim 13, wherein the step of providing the tube with said transverse seams is carried out subsequent to expanding of the tube but prior to guiding of the same along said perforate element.

* * * * *